Oct. 16, 1956 H. H. WOERDEMANN 2,767,257

RING MODULATOR MAGNETIC AMPLIFIER

Filed April 10, 1952 2 Sheets-Sheet 1

INVENTOR.
HUGO H. WOERDEMANN

BY William R. Lane

ATTORNEY

INVENTOR.
HUGO H. WOERDEMANN
BY
William R. Lane
ATTORNEY

United States Patent Office 2,767,257
Patented Oct. 16, 1956

2,767,257

RING MODULATOR MAGNETIC AMPLIFIER

Hugo H. Woerdemann, Whittier, Calif., assignor to North American Aviation, Inc.

Application April 10, 1952, Serial No. 281,597

1 Claim. (Cl. 179—171)

This invention relates to magnetic amplifiers, and particularly to a magnetic amplifier for amplification of very low level input signals to low current level output signals.

In magnetic amplifiers of the type shown and described in Patent No. 2,068,188, issued January 19, 1937, to F. G. Logan for "Electric Controlling Apparatus," a rectifier is employed to convert unidirectional load current flowing in each of the saturable reactor load windings to alternating current for application to a load. A difficulty experienced with this arrangement has been that at low values of current through the rectifier the forward resistance of the rectifier is not uniform and may cause distortion of the output. This is particularly true where no particular effort is made to select a rectifier for its characteristics at low level operation. This invention contemplates an improved magnetic amplifier circuit which is independent of the nonlinear characteristics of rectifiers at low level operation, and which has the same amplification characteristic for both large and small current flow through the load. In addition, this invention contemplates provision of a self-feedback feature in the magnetic amplifier which permits amplification of low level input signals to low or high values of current output from the magnetic amplifier.

It is therefore an object of this invention to provide a magnetic amplifier of improved versatility.

It is another object of this invention to provide a magnetic amplifier whose characteristics are substantially independent of the characteristics of the rectifiers used therein.

It is another object of this invention to provide a magnetic amplifier whose linearity is not influenced by the characteristics of the rectifier utilized therein.

Other objects of invention will become apparent from the following description taken in connection with the accompanying drawings, in which.

Figure 3:
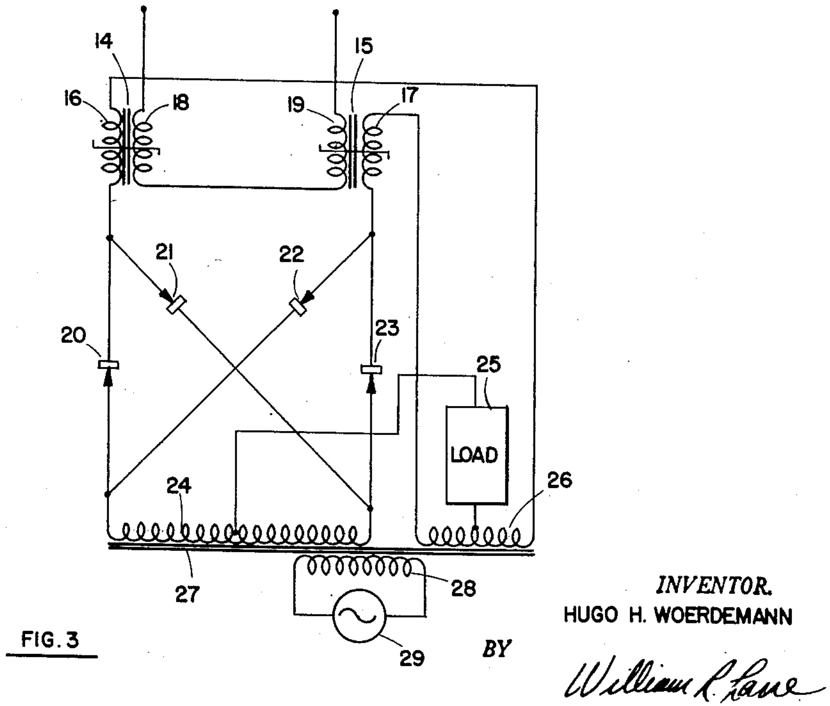

And Fig. 3 is a circuit diagram of a second embodiment of the invention.

Figure 1:
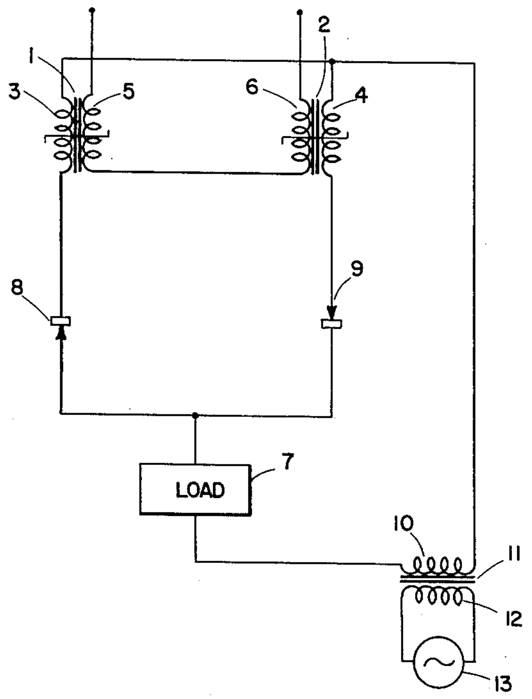
Fig. 1 is a circuit diagram of a magnetic amplifier which utilizes a conventional rectification scheme.

Referring to the drawings, and in particular to Fig. 1, there is shown a magnetic amplifier including saturable reactors 1 and 2 having load windings 3 and 4 and control windings 5 and 6. Load windings 3 and 4 are connected to load 7 by rectifiers 8 and 9 and transformer secondary winding 10 of transformer 11 whose primary winding 12 supplied with alternating current from source 13 completes the circuit. In the arrangement shown in Fig. 1, current flows unidirectionally—first through load winding 3 and then through load winding 4. That this current flow is unidirectional is assured by rectifiers 8 and 9 which permit current flow in only one direction. Since these rectifiers are connected together as shown, load 7 is supplied with alternating current, the average amplitude of which is controlled by a signal supplied to control windings 5 and 6.

In the arrangement shown in Fig. 1, when the load current is very small the current flowing in load 7 may or may not be sufficient to cause rectifiers 8 and 9 to open and close ideally. In other words, at very low values of load current, rectifiers 8 and 9 may be compared to variable resistances of unpredictable value.

Figure 2:
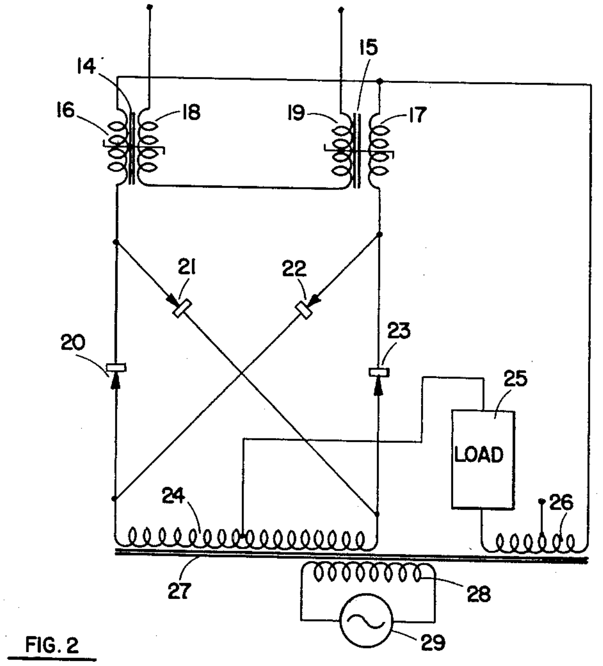
Fig. 2 is a circuit diagram of the invention.

Referring now to Figs. 2 and 3, saturable reactors 14 and 15 having load windings 16 and 17 and control windings 18 and 19 are connected to rectifiers 20, 21, 22, and 23. These rectifiers are in turn connected as shown to transformer secondary winding 24 and by the center tap of this winding to load 25 and transformer secondary winding 26. The primary winding 28 of transformer 27 is supplied witn alternating current from a source 29. The voltage developed across secondary winding 24 is, for this invention, required to be at least twice the voltage developed by transformer winding 26.

In operation, the device shown in Fig. 2 functions as follows. During a first half cycle of voltage developed across secondary winding 24, rectifiers 20 and 21 are both positively caused to conduct by the voltage developed in winding 24. Current may then flow from load winding 16 through the conducting rectifiers 20 and 21, through the right and left halves of winding 24, and through load 25. During this half cycle, rectifiers 22 and 23 are positively and effectively closed so that no current may flow through them. During the succeeding half cycle, the voltage developed across winding 24 causes rectifiers 22 and 23 to conduct, and rectifiers 20 and 21 are closed. During this half cycle, current may flow through load 25, winding 24, rectifiers 22 and 23, and load winding 17. Since the voltage developed by winding 24 is always at least twice as large as the voltage developed by winding 26, the rectifiers are caused to open and close in response to a voltage sufficiently large so that rectifiers operate substantially in the same manner for low level load current as they would for relatively high level load current in a conventional magnetic amplifier circuit.

In the embodiment of the invention shown in Fig. 3 the circuit has been modified slightly by connecting load winding 17 to one end of transformer winding 26 and connecting the load to the center tap of winding 26. In this arrangement, pulsating direct current is applied to load 25; whereas in the arrangement shown in Fig. 2, alternating current flows through load 25.

Since the load current flows unidirectionally through load windings 16 and 17 the greater portion of saturation current required by saturable reactors 14 and 15 is supplied by the load current. A relatively small amount of current is therefore required to be supplied by control windings 18 and 19, and a very low level signal may be amplified readily to either a low or high level of current flowing through the load. This invention is particularly useful, however, where the low load current level characteristics of the magnetic amplifier are important. Since rectifiers 20, 21, 22, and 23 are effectively "carrier switched" or caused to be opened and closed like relays or other switches by the voltage developed in transformer secondary winding 24, the rectifiers are caused to operate on a portion of their characteristic curve which is relatively predictable.

Although the invention has been described and illustrated in detail, it is to be clearly understood that the same is by way of illustration and example only and is not to be taken by way of limitation, the spirit and scope of this invention being limited only by the terms of the appended claim.

I claim:

A magnetic amplifier comprising a pair of saturable reactors each having a load and a control winding; a transformer having a primary winding, a first secondary winding, and a second secondary winding having a voltage output at least double that of said first secondary winding, said second winding being center tapped; rectifiers connected to one end of each said load windings and to the ends of said second secondary winding oriented to permit current flow from one saturable reactor load winding to one end of said second secondary winding, from the other saturable reactor load winding to the other end of said second secondary winding, to said one saturable reactor load winding from said other end of said second secondary winding and to said other saturable reactor load winding from said one end of said second secondary winding; and means connecting said center tap to said first secondary winding, a load to be supplied with an amplified voltage, and the other ends of said load windings in series circuit whereby a voltage applied to said control windings in series is amplified if alternating current is supplied to said primary winding.

References Cited in the file of this patent

UNITED STATES PATENTS

| | | |
|---|---|---|
| 2,068,188 | Logan | Jan. 19, 1937 |
| 2,458,937 | Glass | Jan. 11, 1949 |
| 2,573,818 | Votruba | Nov. 6, 1951 |
| 2,615,066 | Milne | Oct. 21, 1952 |

OTHER REFERENCES

"Magnetic Amplifiers," Vickers Electric Division Bulletin 20-A, page 5, Figs. 8 and 9.